Dec. 27, 1927.  1,653,783
H. W. ROBINSON ET AL
REMOVAL OF TAR ACIDS FROM AMMONIA LIQUOR AND OTHER LIQUORS
Filed June 23, 1926
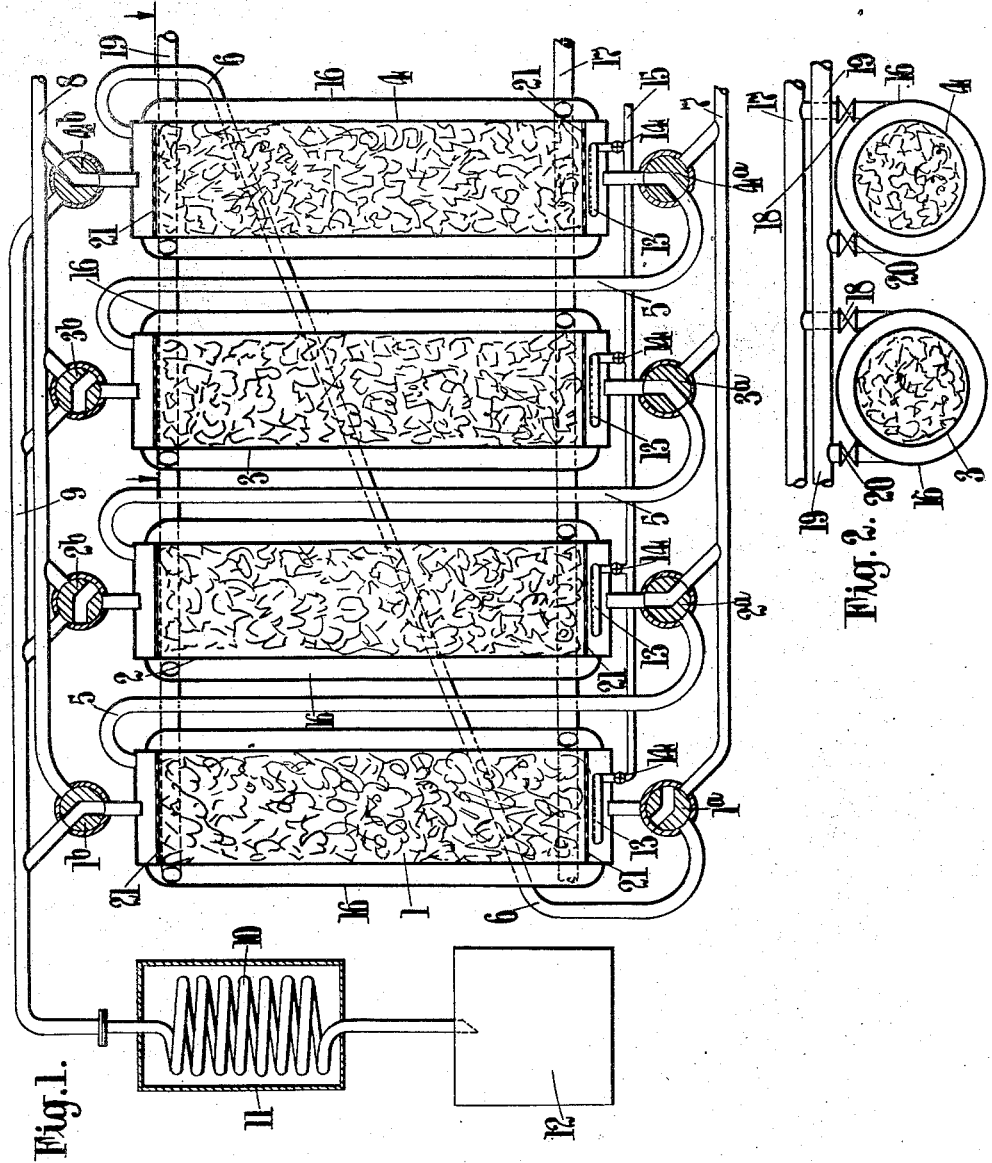
INVENTORS
Herbert William Robinson
Deric William Parkes
BY
Gill & Jennings
ATTORNEYS Patented Dec. 27, 1927.

1,653,783

UNITED STATES PATENT OFFICE.

HERBERT WILLIAM ROBINSON, OF BIRMINGHAM, AND DERIC WILLIAM PARKES, OF WEST BROMWICH, ENGLAND.

REMOVAL OF TAR ACIDS FROM AMMONIA LIQUOR AND OTHER LIQUORS.

Application filed June 23, 1926, Serial No. 117,982, and in Great Britain August 7, 1925.

This invention relates to an improved process and apparatus for removing and recovering tar acids from liquors and particularly for removing and recovering small amounts of tar acids from large quantities of liquor.

According to the present invention, the ammonia liquor is acidified, and subsequently brought into contact with activated carbon, it being desirable, of course, to allow any sludge present to be deposited after the acidifying treatment. The acidification may be carried out by saturating the liquor with carbon dioxide or by means of mineral acid. The tar acids are removed from the carbon, preferably by heating the carbon under reduced pressure or in a current of superheated steam; or by means of a combination of these. Gases such as nitrogen, carbon dioxide and flue gases may be also used instead of steam. After removing the tar acids, it is advisable to cool the carbon in a current of inert gas.

The whole process may be carried out either as a batch process or as a continuous process, and in order that the invention may be clearly understood and readily carried into effect, a process of each of these types will now be described as examples of processes in accordance with the invention.

In carrying out an example of a batch process, 1000 ccs. of ammonia liquor containing 0.421 per cent of tar acids are saturated with carbon dioxide gas and allowed to stand until the precipitated solids have settled. The clear liquor is then agitated for one hour with 50 gms. of activated carbon. The carbon is filtered off and the tar acids removed by heating the carbon at 370-600° C. in a current of steam superheated to about 300° C. After removal of the tar acids the carbon is cooled in a current of carbon dioxide. The carbon is now transferred to a fresh batch of liquor and the process is repeated.

After 18 litres of the above liquor have been thus treated it is found that 96.85 per cent of the total tar acids present have been removed from the liquor and of the tar acids so removed 80.86 per cent have been recovered. If the process is continued by applying the carbon to a further 1000 ccs. of liquor it is found that the carbon will still remove over 90 per cent of the tar acids present in this liquor.

A suitable form of apparatus for carrying out a continuous process in accordance with the present invention is diagrammatically illustrated in the accompanying drawings, in which:

Fig. 1 is a diagrammatic elevation of the plant with four treating chambers;

Fig. 2 is a part plan showing the connections to the heating jackets of two of the chambers.

The chambers numbered 1–4 contain activated carbon and are connected together in series by means of pipes 5, the top of one chamber being connected to the bottom of the next in the series as shown in the drawings. The top of the last chamber numbered 4 is connected by a pipe 6 to the first chamber numbered 1 of the series. The bottom of each chamber is provided with a three-way valve, these being numbered $1^a$–$4^a$ and are connected to a liquor supply pipe 7, and by means of which the liquor may be passed direct into the bottom of any one of the chambers. The top of each chamber is similarly provided with a three-way valve, these being numbered $1^b$–$4^b$, and by means of which liquor may be conducted from any of the chambers to the outlet pipe 8 or to a pipe 9 leading to a condenser coil 10 in a chamber 11. The outlet end of the coil 10 leads into a collecting vessel 12 for the tar acids. The chambers 1–4 are provided with perforated rings 13 connected through valves 14 to a steam supply pipe 15, and with jackets 16 by means of which the chambers may be heated externally. In the drawings, the jackets 16 are shown supplied with hot gas such as flue gas at the bottom of each from a common inlet pipe 17, the inlet to each jacket being independently controlled by valves 18. The gases from the jackets 16 are taken off through a common outlet pipe 19, each outlet also being independently controlled by valves 20. Suitable grids 21 are disposed above and below the activated carbon in the chambers.

When carrying out a continuous process, previously acidified and settled liquor is admitted to the pipe 7, and with the valves positioned as shown in the drawings, the liquor is admitted to the bottom of the second chamber 2 of the series, and flowing upwards through this chamber passes through the corresponding pipe 5 into the bottom of the next chamber of the series, and so on to the last chamber. From the last chamber, the liquor flows into the outlet pipe 8. The liquor is admitted to the chambers 2, 3 and 4 at such a speed that the effluent liquor contains no tar acids, these having all been absorbed by the activated carbon contained in these chambers. During the time that the liquor is being admitted to chambers 2, 3 and 4 as shown in the drawing, the carbon which has become saturated with the tar acids in chamber 1 of the series is being heated to drive off these tar acids. For this purpose superheated steam at a temperature of about 390–400° C. is supplied to the pipe 15 and is admitted through the valve 14 to the bottom of chamber 1, while the carbon is heated by means of heat supplied to the jacket 16 of this chamber to a temperature of about 400–600° C. During this steaming-out process, the valve $1^b$ is in communication with the condenser coil 10 and the valve $1^a$ is closed completely. When all the tar acids have been removed from the carbon in chamber 1, the steam supply is cut off by operating the valve 14 of this chamber and the chamber connected up in series with the other chambers, chamber 2 now being cut out of the series and the tar acids removed from the carbon in this latter chamber. To effect this operation, valve $1^b$ is turned so as to cut off communication with the condenser 10 and to establish communication with the outlet pipe 8. The valve $1^a$ is operated so as to connect chamber 1 with the pipe 6, while the valves $2^a$ and $4^b$ are closed altogether. Finally, valve $2^b$ is opened to the condenser 10 through the pipe 9 and the valve $3^a$ opened to the pipe 7. Superheated steam is now passed through the valve 14 of chamber 2 and the carbon heated through the external jacket 16 of this chamber, the tar acids being thus removed and carried off to the condenser 10. During this steaming-out process, the liquor is being admitted to the bottom of chamber 3 and flows through pipe 5 to the bottom of chamber 4, and from the top of this latter chamber through the pipe 6 to the bottom of chamber 1. As valve $1^b$ is now opened to the outlet pipe 8, the liquor now flows out through this pipe. This sequence of operations is repeated for each of the chambers in turn, and it is thus seen that a simultaneous absorbing and removal of the tar acids is being continually effected. After each steaming-out process, the chamber through which the steam has been passing is cooled before being connected up again to the other chambers of the series. Instead of steaming-out the tar acids from the carbon while this latter is in the chambers, the carbon may be removed to a separate still or retort and the tar acids then removed from the carbon.

An example of the operation of such an apparatus will now be given. 61 litres of liquor containing .421 per cent of tar acids are subjected to the preliminary treatment including acidification as described above and passed through the apparatus containing 150 gms. of carbon at an average speed of 1.89 litres per hour. The liquor is completely freed from tar acids and 81.8 per cent of the tar acids removed by the carbon are recovered.

Ordinary commercial activated carbon may contain iron compounds and it has been found advantageous to remove such compounds by giving the carbon a preliminary treatment with acid. The carbon is then washed with water and heated under reduced pressure in a current of superheated steam or inert gas.

Having thus described our invention, what we claim as new and desire to secure by Letters Patent is:—

1. A process for removing tar acids from ammonia liquor, which consists in acidifying the liquor and then bringing the liquor into contact with activated carbon.

2. A continuous process for removing tar acids from ammonia liquor, which consists in acidifying the liquor, admitting the said liquor to the bottom of some of a number of chambers containing activated carbon and connected in series to absorb the tar acids from the said liquor, passing steam through the remainder of the chambers and then condensing the tar acids removed by the steam.

3. A process for removing tar acids from ammonia liquor, which consists in saturating the liquor with carbon dioxide gas, agitating the liquor with activated carbon to absorb the tar acids and removing the tar acids from the carbon by distillation.

4. A process for removing tar acids from ammonia liquor, which consists in treating the liquor with carbon dioxide gas, agitating the liquor with activated carbon to absorb the tar acids and distilling off the tar acids from the carbon by external heating and by direct contact of steam.

5. A process for removing tar acids from ammonia liquor, which consists in acidifying the liquor, and then bringing the liquor into contact with activated carbon which has been heated under reduced pressure, heated in an atmosphere of an inert gas, and then cooled in an atmosphere of an inert gas.

In witness whereof we hereunto subscribe our names this 27th day of May, 1926.

HERBERT WILLIAM ROBINSON.
DERIC WILLIAM PARKES.